United States Patent [19]

Foster

[11] Patent Number: 4,611,708
[45] Date of Patent: Sep. 16, 1986

[54] RECIPROCATING CHANNEL FLOOR CONVEYOR

[76] Inventor: Raymond K. Foster, P.O. Box 1, Madras, Oreg. 97741

[21] Appl. No.: 680,070

[22] Filed: Dec. 10, 1984

[51] Int. Cl.$^4$ .................. B65G 25/04; B65G 37/00
[52] U.S. Cl. ........................... 198/750; 414/525 R; 414/509; 62/344; 62/378; 198/747
[58] Field of Search .............. 198/750, 648, 850, 853, 198/775, 851, 621, 747; 308/3 A, 3 C, 3 R, 3.6; 414/525 B, 525 R, 509, 304, 325; 62/344, 378; 222/146.6

[56] References Cited

U.S. PATENT DOCUMENTS

| | | | |
|---|---|---|---|
| 2,222,024 | 11/1940 | Field | 222/146.6 |
| 2,912,128 | 11/1959 | Kamin | 414/509 |
| 2,965,251 | 12/1960 | Ganahl | 414/509 |
| 2,973,856 | 3/1961 | Brooks | 414/525 B |
| 3,070,970 | 1/1963 | Zagar et al. | 62/378 |
| 3,262,541 | 7/1966 | De Gain | 198/621 |
| 3,905,290 | 9/1975 | Caughey | 100/215 |
| 3,910,422 | 10/1975 | Zierpka | 198/621 |
| 4,144,963 | 3/1979 | Hallstrom | 198/750 |
| 4,492,303 | 1/1985 | Foster | 414/525 B |

FOREIGN PATENT DOCUMENTS

| | | | |
|---|---|---|---|
| 2452648 | 6/1975 | Fed. Rep. of Germany | 198/775 |
| 57-83329 | 5/1982 | Japan | 308/3 A |
| 488669 | 7/1938 | United Kingdom | 414/525 B |

Primary Examiner—Joseph E. Valenza
Assistant Examiner—Daniel R. Alexander
Attorney, Agent, or Firm—Delbert J. Barnard

[57] ABSTRACT

A plurality of floor members (40, 58, 106) are supported on guide beams (16, 18, 60, 102). The guide beams (16, 18, 60, 102) are spaced apart such that the floor members (40, 58, 106) have spaces between their side portions. The guide beams (16, 18, 60, 102) have oppositely directed flanges (26, 78, 80, 112, 114) secured to their tops. Bearing members (30, 116) slip over these flanges and rest on top of the guide beams (16, 18, 60, 102). Bottom members (20, 64, 98) extend laterally between the guide beams (16, 18, 60, 102), to form channels in the regions between the floor members (40, 58, 106). In one embodiment, refrigerated air is directed through these channels. In a second embodiment, the channel is used to collect small particles of ice and ice water. In a third embodiment, garbage is allowed to enter into the channel space. The sidewalls (108, 110) of the floor members (106) engage this garbage and move it when the floor members (106) are moving and hold it when the floor members (106) are stationary. The floor in which refrigerated air is circulated through the channels, and the floor in which small ice particles and ice water are collected in the channels, is set on an insulated base. The garbage conveying floor may be set on an incline, for lifting garbage up from a lower level to an elevated level above the open top of a container (92) provided for collecting the garbage (96).

35 Claims, 19 Drawing Figures

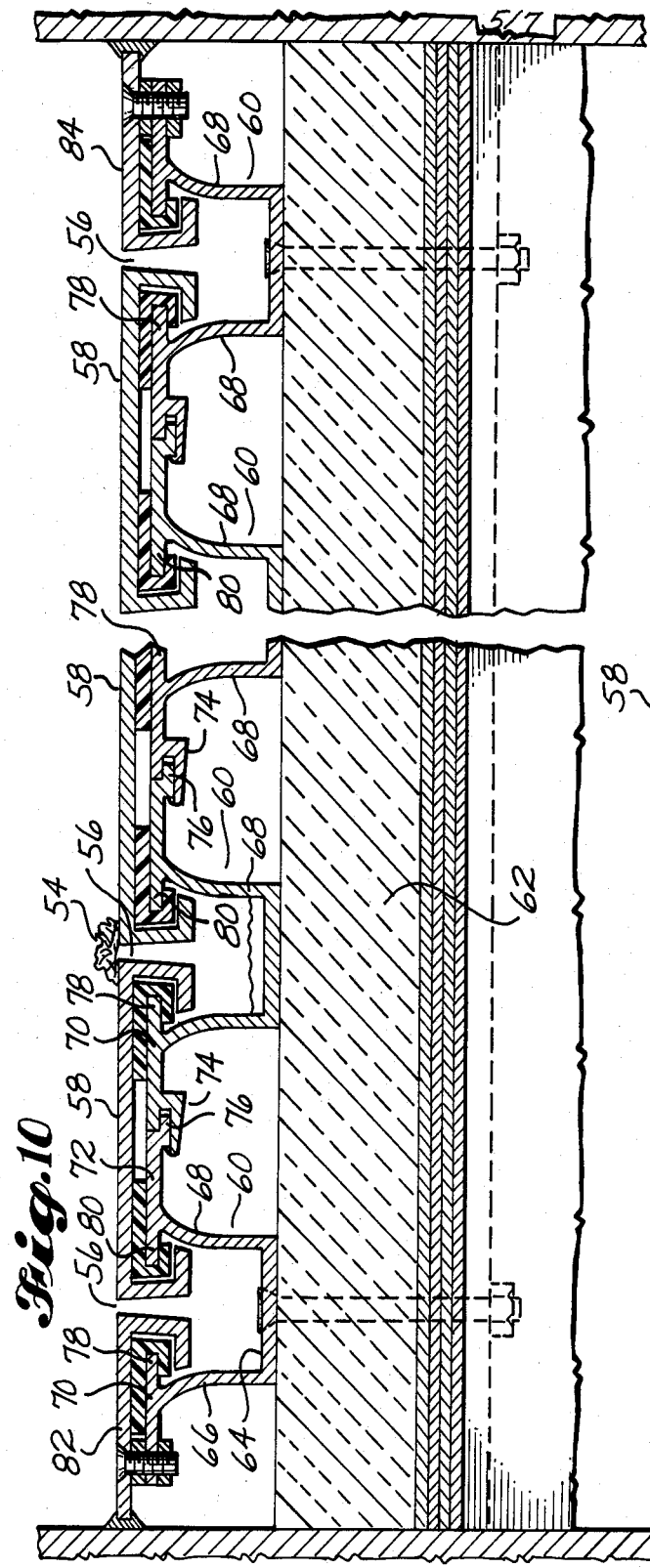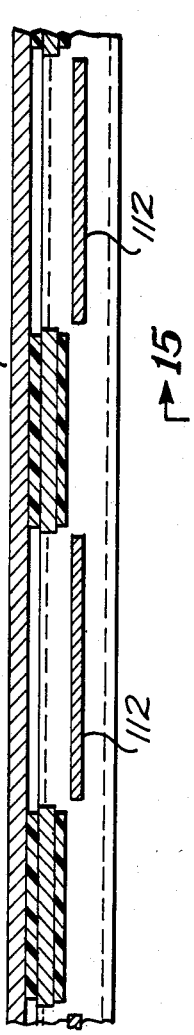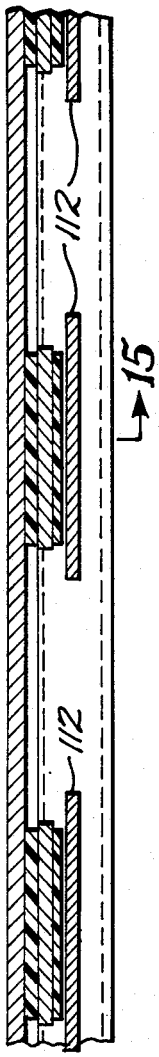

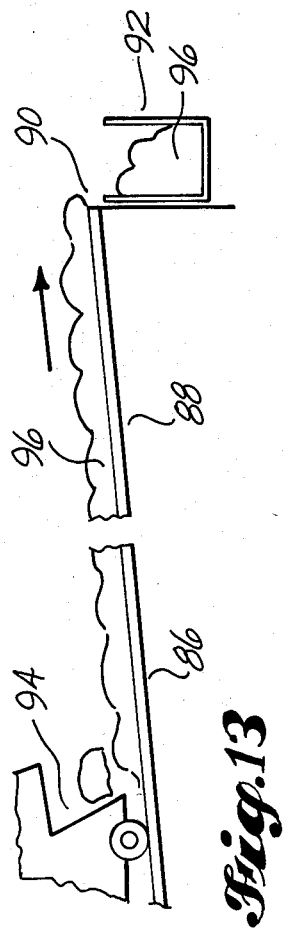
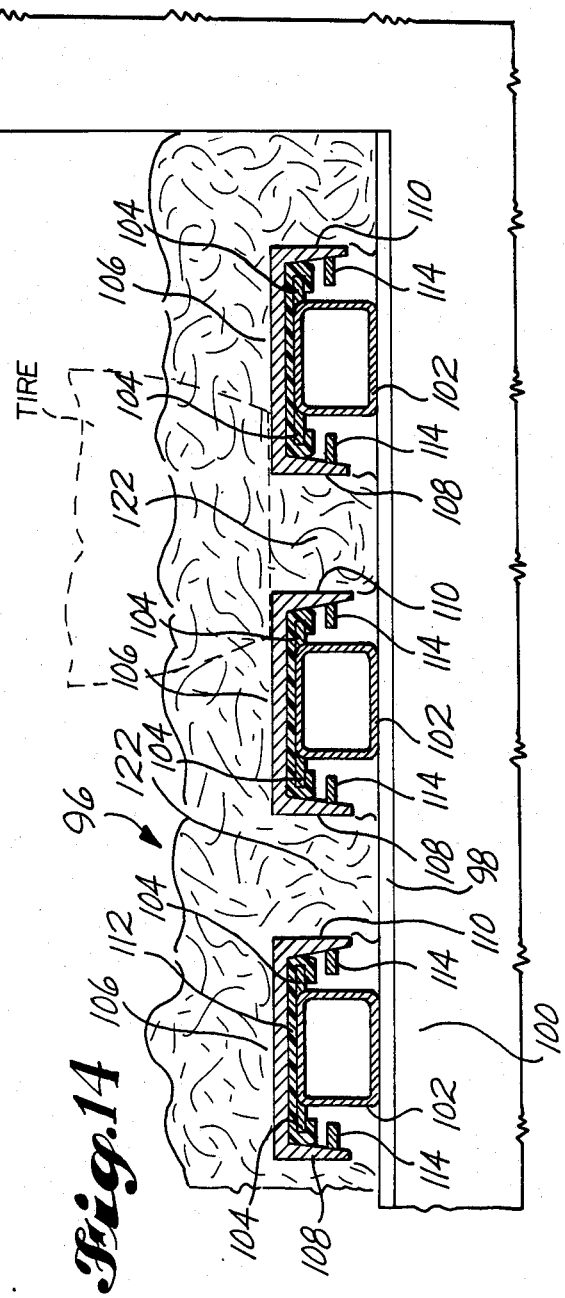
Fig.13
Fig.14

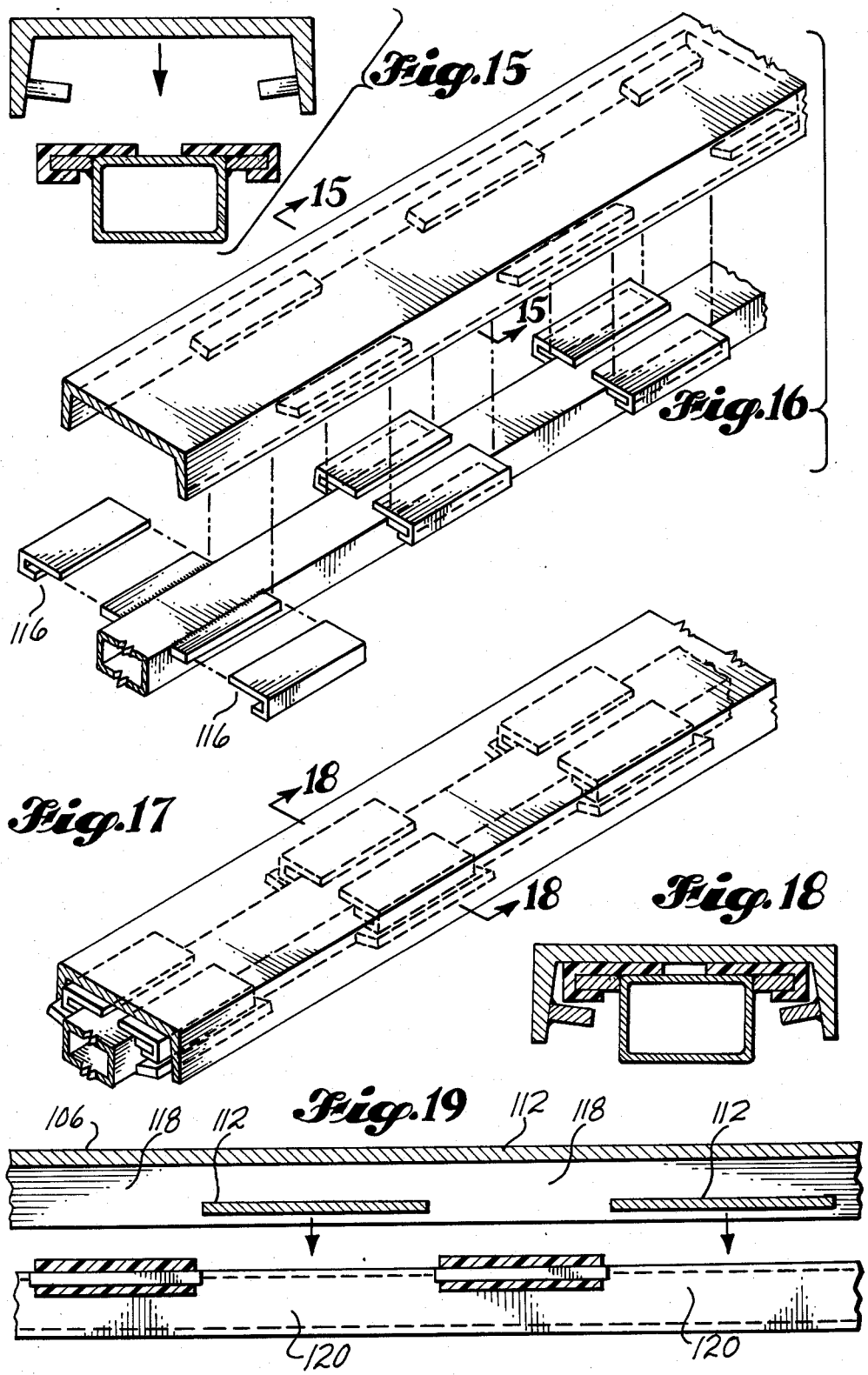

ined in a number of environments. They are being installed as floors in the bottoms of large trucks and trailers, for use in both loading and unloading cargo. They are also being used as floors in stationary installations.

RECIPROCATING CHANNEL FLOOR CONVEYOR

DESCRIPTION

TECHNICAL FIELD

This invention relates to reciprocating floor conveyors of a type having laterally spaced apart floor members and channel regions between the floor members. The invention also relates to a method of using such a floor for conveying a load within a refrigerated compartment, to a method of using such a floor for conveying particle ice, and to a method of using such floor for conveying garbage.

BACKGROUND ART

Reciprocating floor conveyors are presently being used in a number of environments. They are being installed as floors in the bottoms of large trucks and trailers, for use in both loading and unloading cargo. They are also being used as floors in stationary installations.

Heretofore, in most conveyors of this type seals have been provided to seal the spaces between adjacent floor members. A typical type of seal arrangement is disclosed by FIG. 6 of U.S. Pat. No. 4,144,963.

U.S. Pat. No. 4,144,963 also discloses a conveyor which is adapted to function as a particle separater. This conveyor does not include seals between adjacent floor members. The floor members are constructed to taper from regions in which they are close together to regions whereat spaces are provided between them. The spacing between adjacent floor members increases progressively towards the outward end of the conveyor. Accordingly, by the reciprocative motion of the floor members, particulate material of diverse sizes deposited on the infeed end of the conveyor progresses towards the outfeed and falls by gravity through the variable spacing between adjacent floor members. In this manner, smaller sizes of particulate material will be separated adjacent the infeed end of the conveyor, whereat the spacing between adjacent slats is at a minimum. The large sizes of particulate material will be separated adjacent the outfeed end of the conveyor whereat the spacing between adjacent slats is at a maximum.

An object of the present invention is to provide a conveyor construction in which the floor members are parallel to each other and between which spaces and channel regions are provided for a plurality of diverse purposes.

U.S. Pat. No. 3,905,290, granted Sept. 16, 1975, to Robert A. Caughey, discloses various arrangements of a reciprocating slat conveyor for conveying particulate material into and through a press. Some forms of the conveyor utilize right angle oriented surfaces on separate slat members for moving the material. An object of the present invention is to utilize right angle related surfaces on a single floor member for moving material. Specifically, the upper and side surfaces of laterally spaced apart floor members are used to move material (e.g. garbage) which is located both on top of and between the floor members. This arrangement solves the problem of providing a floor which can move very abrasive material, such as garbage, without the need of providing a seal between adjacent floor members. The seals are omitted, and the spaces between adjacent floor members are enlarged, and are used in the scheme of operation of the conveyor.

DISCLOSURE OF THE INVENTION

Basically, the present invention is characterized by a plurality of laterally spaced apart support beams, each of which supports a separate floor member for longitudinal reciprocation. The floor members are laterally spaced apart and channel spaces are defined between adjacent floor members.

In accordance with an aspect of the invention, upper portions of the guide beams are provided with laterally projecting flanges. Bearings are provided which fit onto these flanges. The bearings include upper portions which set down on top of the guide beams, lower flanges which are situated below the guide beam flanges, and interconnecting webs which are situated outwardly of the adjacent edges of the guide beam flanges.

In accordance with an aspect of the invention, the floor members have top walls which set down on top of the bearings. The floor members include sidewalls which depend downwardly from the opposite ends of the top walls, outwardly adjacent the web portions of the bearings. The floor members include inwardly projecting flanges which underlie the lower portions of the bearings.

In accordance with another aspect of the invention, the guide beams and bottom members between the guide beams are integral parts of extruded metal shapes. The metal shapes have interfitting lock edges by which they are joined to form a continuous pattern of guide beams and channels between guide beams, across the full width of the floor.

In accordance with yet another aspect of the invention, the flanges on the floor members are segments spaced apart to provide spaces between the segments. The flanges on the guide beams are also segments spaced apart to provide spaces between such segments. The floor member is installed onto and removed off from its guide beam by aligning its flanges with the spaces between the flanges on the guide beams. At the same time, this aligns the flanges on the guide beam with the spaces between the flanges on the floor member. The floor member is then simply moved vertically, either downwardly onto the bearings, or upwardly up from the bearings. After installation, the floor member is moved longitudinally to place its flange segments below the bearing carrying flange segments of the guide beam. This interference positioning of the two sets of flanges prevents the floor member from being inadvertently removed fom the guide beam.

In accordance with a method aspect of the invention, the reciprocating floor conveyor is constructed on an insulative base and serves as a floor for a compartment or room that will be refrigerated. A load is placed on top of the floor members and refrigerated air is circulated through the channels defined through the floor members. The refrigerated air flows through the channels and upwardly through the spaces between the floor members into contact with the load.

In accordance with another method aspect of the invention, a reciprocating floor conveyor is mounted onto an insulative base and is used for conveying particle ice. The floor members are spaced relatively close together so that a space is defined which is smaller than at least most of the ice particles. The channels between the floor members are used for collecting ice water and very small ice particles and conveying them away from the body of particle ice on the conveyor.

In accordance with yet another method aspect of the invention, relatively wide spacing between adjacent floor members is used. The floor is mounted onto a concrete pad or other substantial base and is used for receiving and conveying garbage. Floor members, guide beams and bearings are used which are capable of carrying heavy loads, so that garbage trucks can be driven out onto the floor. The spaces between adjacent floor members are narrower than the tires of the garbage trucks. However, they are wide enough that garbage material can fit down into the spaces. The sidewalls of the floor members are relatively deep and provide surfaces of substantial area in contact with the garbage in the spaces between adjacent floor members. These side surfaces of the floor members serve to frictionally grip and move the garbage, as the floor members are being moved, or hold the garbage, as the floor members are being held stationary. Garbage is particularly tough on seal material and would very quickly abrade away any seal provided between adjacent floor members. This construction of providing a relatively large space between adjacent floor members, and allowing the garbage to enter the space, results in a relatively clean floor without the need for seals. The garbage between the side surfaces of adjacent floor members is quite efficiently moved by the floor members. Accordingly, the channel spaces between floor members are not left full of garbage. Whatever little garbage remains, can easily be washed out by use of water from a hose.

Additional objects, features and advantages of the invention are set forth in the description of the preferred embodiments. Such description of the preferred embodiments, and the claims which follow the description of the illustrated embodiments, both constitute additional portions of the description of the invention.

BRIEF DESCRIPTION OF THE DRAWINGS

Like referenced numerals are used throughout the several views of the drawings to designate like parts, and:

FIG. 10 is a cross-sectional view of a modified form of floor, with a midsection of the floor being cut away, to indicate an indeterminate width of the floor, such view showing a manner of constructing side boundary portions of the floor, and showing particle ice on the floor over a space between adjacent floor members, and showing water being collected in a channel provided below such space, for carrying away the water and small ice particles;

FIG. 11 is a longitudinal sectional view of a floor member and a guide beam, showing a construction of the floor member, the guide beam and bearing members which will allow the floor member to be installed vertically downwardly and removed vertically upwardly from the guide beams, such view showing inwardly projecting flange portions of the floor members in vertical alignment with open spaces provided between outwardly projecting flange segments on the guide beams;

FIG. 12 is a view like FIG. 11, but showing the floor member shifted in position to place its flange segments below the flange segments of the guide beam, such view representing the in use position of the floor member;

FIG. 13 is a diagrammatic view of a reciprocating floor conveyor mounted onto an upwardly sloping surface, and showing a container space below a discharge level at the upper end of the sloping surface, and further showing the rear portion of a garbage truck deposition garbage onto the floor, to be conveyed up the slope and discharged into the container; and FIG. 14 is a cross-sectional view of the floor shown by FIGS. 11-19, showing garbage on the floor members and in the space between adjacent floor members;

FIG. 15 is a cross-sectional view taken substantially along line 15—15 of FIGS. 12 and 16, showing the floor members spaced vertically above the guide beam;

FIG. 16 is a pictorial view taken from above and one side of a fragmentary portion of the floor shown by FIGS. 11-14, with the floor members shown spaced vertically above the guide beam, and with two of the bearing members shown spaced outwardly from their position on flange segments provided on the guide beam;

FIG. 17 is a view taken from the same aspect as FIG. 16, but showing the floor member installed onto the guide beam;

FIG. 18 is a cross-sectional view taken substantially along line 18—18 of FIG. 17; and FIG. 19 is a view like FIGS. 11 and 12, but showing the floor member spaced above the guide beam.

BEST MODE FOR CARRYING OUT THE INVENTION

Figure 1:
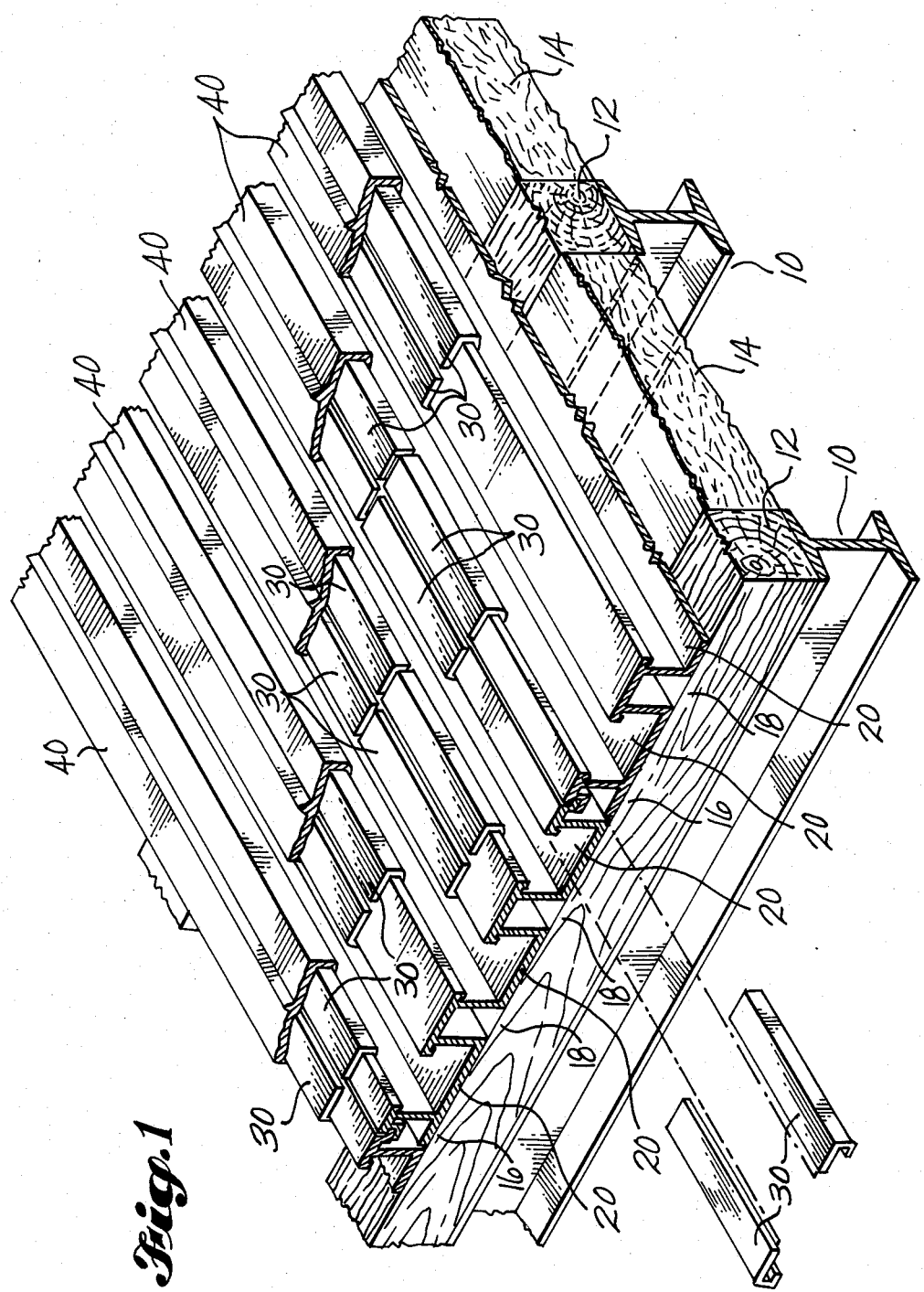
FIG. 1 is a pictorial view taken from above and towards one side of a fragmentary portion of a reciprocating floor conveyor constructed in accordance with the present invention, showing a pair of bearing members spaced out from their positions on upper flange portions of a guide beam, and showing other bearing members omitted, and parts of the floor members cut away, for clarity of illustration of the manner in which the floor members are supported.

Referring to FIG. 1, this figure shows a first embodiment of the invention which is adapted for conveying a load that is located inside of a refrigerated compartment. The floor of the compartment may include spaced apart floor beams 10, shown in the form of metal I-beams. Wood timbers 12 may be supported on top of the beams 10, and planks 14 of a good insulative material may be provided between the beams 12. The beams 12 are both good insulators and structural support members. The planks 14 may be good insulators but not particularly good structural members. This arrangement concentrates the loads of the timbers 12 and the beams 10 below the timbers 12 and not on the insulation 14.

Figure 7:
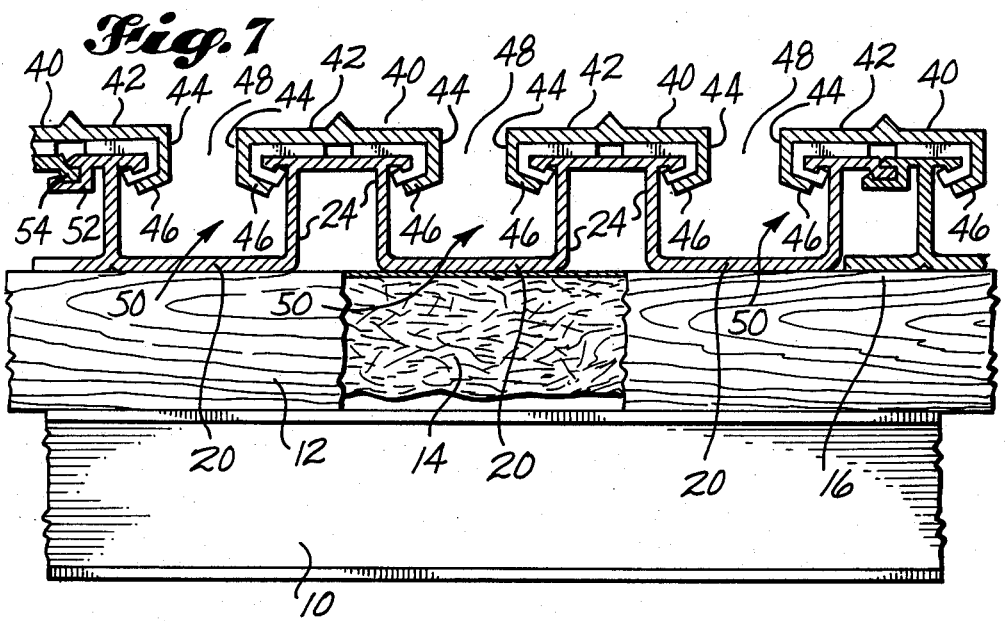
FIG. 7 is a fragmentary cross-sectional view taken through a portion of the floor shown by FIG. 1, with a foreground portion of a support beam cut away to show a plank of heat insulation material that is located in the space between such beam and another beam spaced from it.
Figure 8:
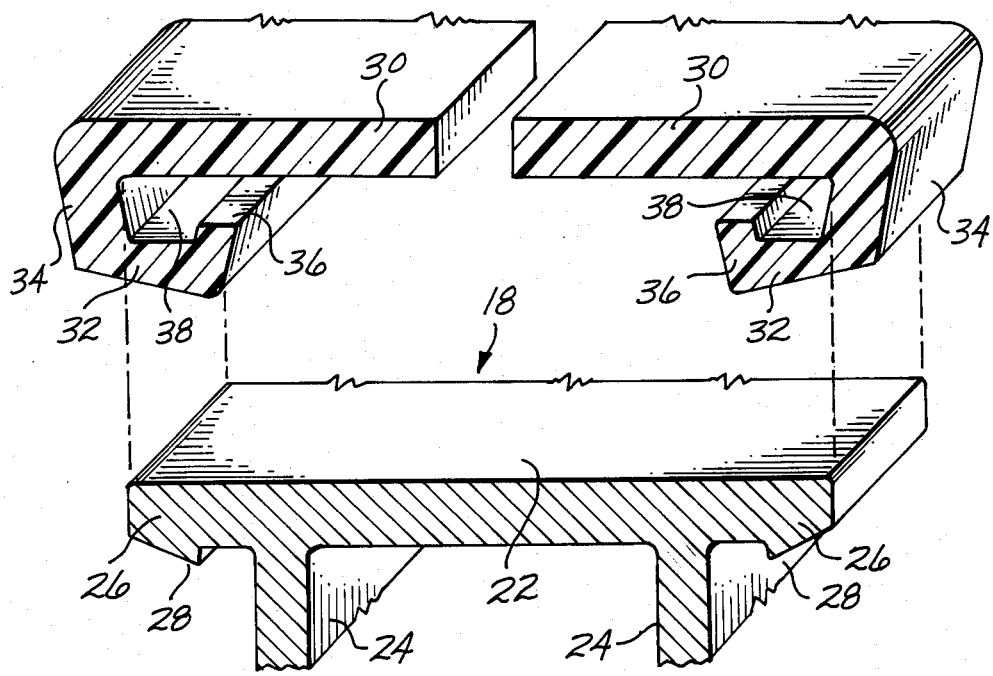
FIG. 8 is an enlarged scale fragmentary view of the upper portion of a support beam, with fragmentary portions of two bearing members being spaced above such support beam.
Figure 9:
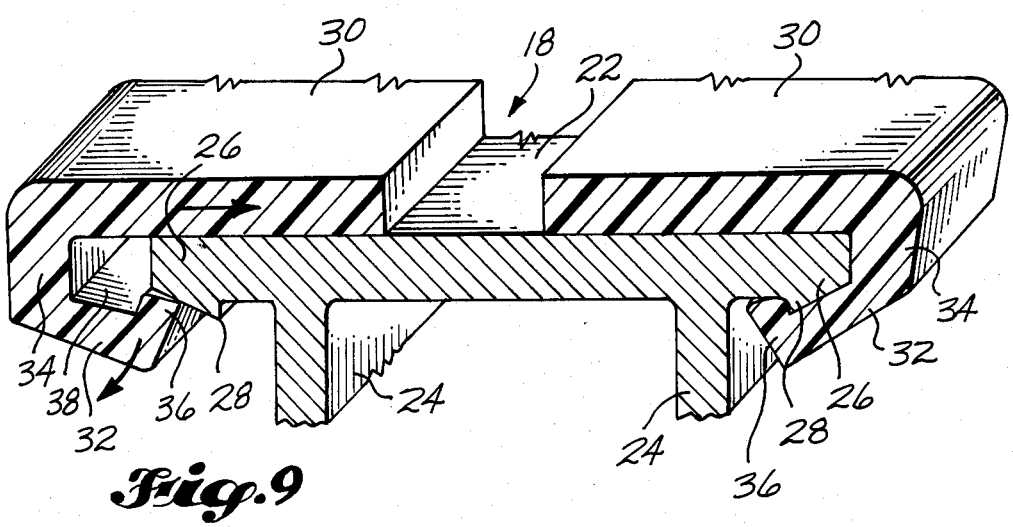
FIG. 9 is a view like FIG. 8, but showing one of the bearing members installed, and the other in the process of becoming installed.

In accordance with the invention, the floor comprises a plurality of support beams 16, 18. The support beams 16, 18 are parallel to each other and they are laterally spaced apart. In this embodiment of the invention, the floor beam assembly is constructed from a plurality of extruded sheet metal shapes which are interlocked together to form a continuous guide beam assembly across the full width of the conveyor. In this embodiment of the invention, each shape comprises two full guide beams 18, and two half portions of guide beams 16. Bottom members 20 are provided between adjacent guide beams 16, 18 or 18, 18. The bottom members 20 are formed integral with the guide beams 16, 18. Bottom members 20 and the sidewall portions of the guide beams 16, 18 define upwardly opening channels between the guide beams 16, 18. As best shown by FIGS. 7–9, the guide beams 18 each comprises a top 22, and sidewalls 24. The top 22 includes a pair of oppositely directed flanges 26. Each flange 26 projects laterally outwardly of the sidewall 24 on each side of guide beam 18.

In the preferred form, each flange 26 includes a downwardly projecting lock lip 28.

The guide beams 16, 18 are provided with bearing means which provide on each side of the guide beams 16, 18 a top portion 30, a lower flange portion 32, a side located web portion 34, and an upwardly directed lock lip 36. In preferred form, the bearing means exists in the form of pairs of bearing members, one member for each side of the guide beams 16, 18. Also in preferred form the bearing members are constructed in segments and the pairs of bearing members are spaced apart longitudinally of the guide beams 16, 18.

As best shown by FIG. 9, the top portion 30, the bottom flange 32, the side web 34 and the upwardly directed lock lip 36, of each bearing member, defines an inner space 38. Each inner space 38 is sized to snugly recieve the outer edge portion of a top flange 26, and its downwardly directed lock lip 28.

As shown by FIG. 9, the bearing members can easily be installed by pushing on them to move them laterally inwardly onto a top flange portion 26 of a guide beam 16, 18. The sloping lower surface of the flange 26 cams the lock lip 36 of the bearing member downwardly. Once the lock lip 36 clears lock lip 28, then lock lip 36 snaps up into a space below flange 26 located inwardly of lock lip 28. The bearing member lock lip 36 engages the inside of the guide beam flange lock lip 28, and holds the bearing member in place on the guide beam 16, 18.

The bearing members may be constructed from a plastic material of a type which is in common use for various types of bearings. The material has an almost oily surface and a quite low coefficient of friction. However, the material is quite tough and can withstand a considerable amount of load.

As shown by FIGS. 1 and 7, the bearing members mount a floor member 40 for back and forth reciprocation on each guide beam 16, 18. Each floor member 40 comprises a top wall 42, a pair of sidewalls 44, and a pair of inwardly directed flanges 46, each flange 46 is connected at its outer edge to the lower edge of a sidewall 44, and projects inwardly below a bearing flange 32.

In this embodiment the floor members 40 are spaced apart a distance between adjacent sidewalls 44 that is less than the width of a floor member 40, but is still substantially large. In the first embodiment, this space 48 permits passage of refrigerated air up from between the floor members 40. The refrigerated air 50 is blown through the channels formed by and between the sidewalls of the guide beams 16, 18, and the bottom members 20. The refrigerated air flows lengthwise of these channels and then upwardly through the spaces 48. The zone above the floor members 40 is a closed space and the load setting down on the floor members 40 is refrigerated by the refrigerated air. The floor insulation 12, 14 minimizes a downward loss of the refrigeration energy through the floor of the compartment.

The side portions of the shapes which make up the guide beams 16, 18 and the bottom members 20, each is in the form of a half guide member 16. As shown by FIGS. 1 and 7, one half of a guide beam 16 on one side of the shape includes an interlock opponent 52 which itself includes a longitudinal channel. The half of the guide beam 16 which is on the other side of the shape includes an interlock component in the form of a lip 54. The lip 54 snugly fits within the channel formed in component 52, to secure adjacent shapes together and to complete a guide beam 16.

In the embodiment shown by FIGS. 1 and 7, the shape comprises two guide beams 18, three bottom members 20, and one of each type of half of a guide beam 16. Of course, in other installations, the number of guide beams 18 can change. The shape may include only one guide beam 18, or it may include more than two. Also, the construction of the interlock can vary.

FIGS. 2–6 illustrate the operation of all of the disclosed embodiments.

Figure 2:
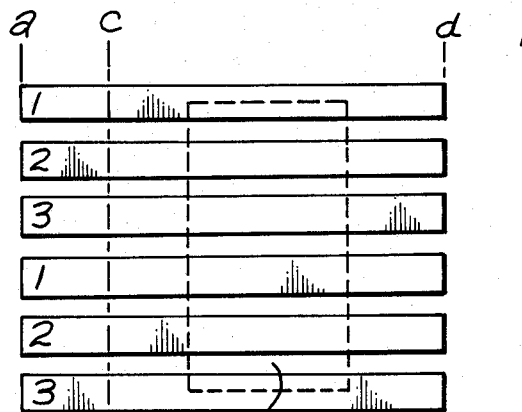
FIG. 2 is a top plan view of a reciprocating floor conveyor constructed in accordance with the present invention, in its start position.
Figure 3:
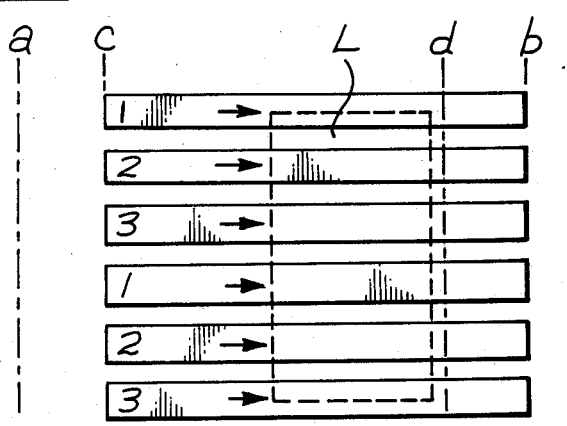
FIG. 3 is a view like FIG. 2, but showing all of the floor members advanced to an advanced position.
Figure 4:
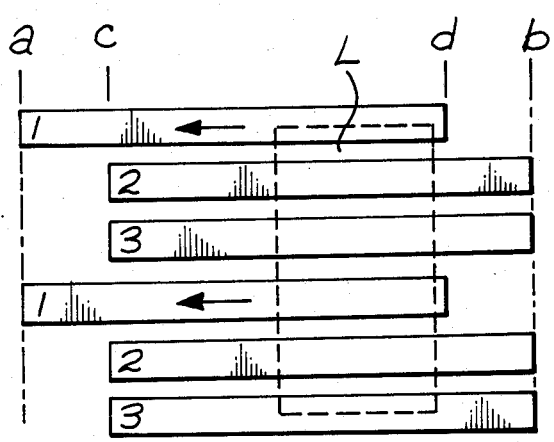
FIG. 4 is a view like FIGS. 2 and 3, but showing floor members "2" and "3" stationary and floor members "1" being retracted to the start position.
Figure 5:
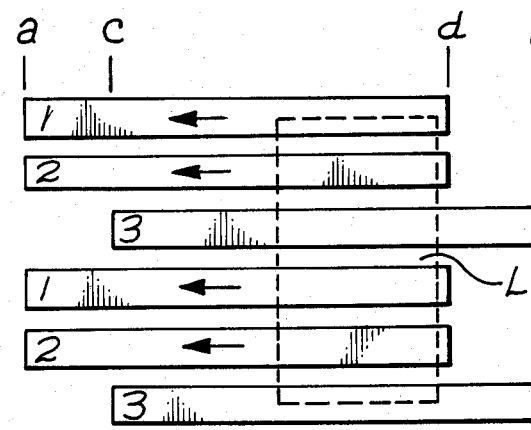
FIG. 5 is a view like FIGS. 2-4, but showing floor members "1" and "3" stationary and floor members "2" being retracted back to the start position.
Figure 6:
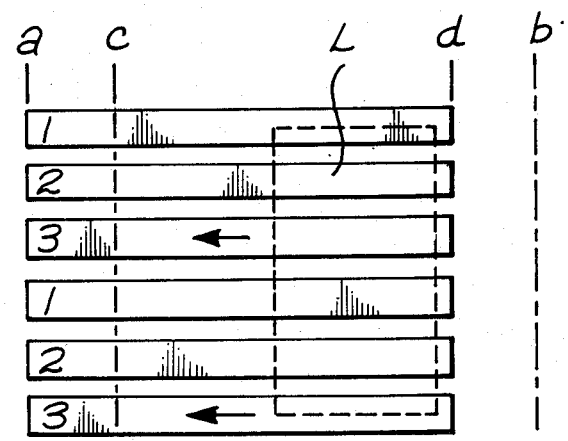
FIG. 6 is a view like FIGS. 2-5, showing floor members "1" and "2" stationary and floor members "3" being retracted back to the start position.

FIG. 2 shows all the floor members in a retracted position in which common ends are lined at a start station a. The load L is shown centrally positioned on the floor. FIG. 3 shows the floor members after they have all been advanced together, to move the load L forwardly, and show the opposite ends of the floor members aligned at a fully advanced position b. FIG. 4 shows the group "1" floor members being retracted and the groups "2" and "3" floor members held stationary. The load L does not move because frictional forces exerted on it by the stationary floor members "2" and "3" are larger than the frictional forces exerted on it by the retracting floor members "1". FIG. 5 shows the next step in the sequence. The retracted floor members "1" and the still advanced floor members "3" are held stationary and the floor members "2" are retracted. Again, the load L does not move. FIG. 6 shows the retracted floor member "1" and "2" stationary and floor members "3" being retracted. Again, the load L does not move. In this example, the load L has moved a distance equal to the endwise movement of the floor, viz. a–c or d–b.

The mechanism for moving the floor members is not a part of the present invention. By way of typical and therefore nonlimitive example, such mechanism may be like the mechanism disclosed by U.S. Pat. No. 4,143,760. Or, it can be like the mechanism that is disclosed in my companion application Ser. No. 680,356 entitled "Reciprocating Floor Conveyor System".

The construction and arrangement of the bearing members, the guide beams 16, 18 and the floor members 40 makes seals unnecessary. A space is intentionally provided between adjacent sidewalls 44 of adjacent floor members 40. Any material which drops down through the space 44 is collected in the closed bottom channels formed by the bottom members 20, and the side members 24. In the embodiment shown by FIGS. 1-9, the channels are used for conveying refrigerated air. The load is a type of load which is intended to stay on top of the floor members 40, i.e. it is in containers or is material which is too large to fall down through the spaces 48.

FIG. 10 discloses a second embodiment of the invention. It is a floor designed to convey particle ice, some of which is shown at 54. In this embodiment, a space 56 is provided between adjacent floor members 58 which is narrower than the ice particles 54. In this embodiment, the channels formed by and between adjacent guide beams 60 are used to collect water, resulting from melted ice, and small ice particles, and carry it out from the region below the mass of particle ice 54 on the floor members 58.

This embodiment also includes an insulated base 62 below the conveyor. In this embodiment, a relatively thick plank form of insulated material 62 is used. As shown, at least some of the guide beam forming shapes 60 may be bolted down.

In this embodiment, each shape 60 may comprise a bottom member 64, a pair of side members 68, and top portions 70, 72. Except for the extreme sides of the conveyor, each top portion 70 may comprise an interlock component 74 of a type which includes a goove. Each top portion 72 may include an interlock component which includes a lip 76 sized to fit within the groove. Each top portion 70, 72 also includes an outwardly projecting flange 78, 80.

This embodiment may include bearing members like the bearing members described above in connection with the first embodiment. The bearing members and the flanges 78, 80 may be like the bearing members and the flanges described above. Or, the complimentary lock lips 28, 30 may be omitted. These elements are not shown in FIG. 10.

FIG. 10 shows that at the opposite sides of the floor one of the shapes may be altered somewhat, and a floor member may be cut and secured to it, to provide a fixed floor member 82, 84 on each side of the conveyor. Each fixed floor member 82, 84 may be secured in place to a top portion 70, 72 of a modified shape. A bearing member may be used, but strictly to provide proper spacing.

FIGS. 11-18 relate to a third embodiment. This embodiment is especially constructed for use in conveying garbage. A floor of this type may be made quite large in size.

FIG. 13 is a diagram of a use of the floor. This diagram shows the floor 86 positioned on an upwardly sloping base structure 88. The base structure 88 might start at normal ground level and end at a discharge level 90 which is spaced above the ground level at an amount sufficient to accommodate a garbage receiving container 92 positioned with its open top at or below the discharge level 90. FIG. 13 shows a garbage truck 94 in the process of depositing garbage 96 onto the floor 86. It shows the floor 86 carrying the garbage upwardly to the discharge level whereat it falls down into the container 92.

In other installations, a plurality of floors of this type can be used for bringing garbage from different directions to the base of the inclined floor. The floors may be designed so that the garbage trucks can be brought up to one side of the floor and the garbage dumped out of the back of the trucks onto the floor. Or, a garbage truck may be backed out onto the floor and its contents dumped directly on the floor.

Referring now to FIGS. 11-14, this embodiment of floor may be constructed by first securing sheets of plate steel 98 onto a concrete base 100, so that the entire upper surface of the concrete base 100 is covered by sheet steel. Then, guide beams 102 may be provided which are in the form of metal shapes, i.e. rectangular tubing, which is welded or otherwise secured to the plate material 98. The tops of the members 102 are provided with a pair of outwardly projecting flanges 104, one on each side of each member 102. Flanges 102 may be strips of plate material which have been welded to the upper corner portions of the members 102.

In this embodiment, the floor members may be constructed from lengths of steel channel material 106, each of which comprises a pair of flanges 108, 110 and a web 112. The open side of the channel is directed downwardly. The web 112 becomes the top of the floor member 106. The flanges 108, 110 become the sidewalls of the floor member 106. In this embodiment, flanges 112, 114 may be welded to the lower inner portions of the sidewalls 108, 110. Bearing members 116 may be used which are generally of the type which have been described above in connection with the first two embodiments. In this embodiment, the bearing members which have been illustrated do not include lock lips.

In this embodiment, the floor members are quite long. To facilitate installation and removal of the floor member, flange segments 104, 112, 114 are used, instead of full length flanges. Flange segments 112, 114 are secured in pairs to the sidewalls 108, 110. Open spaces are provided between the segments 112, 114. These open segments are of a length to accommodate the flange segments 104 which are welded to the members 102. The bearing members 116 are of substantially the same length as the flange members 104.

As shown by FIG. 18, a floor member 106 is installed by positioning it over a guide beam member 102, in a position with the surfaces 118 aligned with the bearings 116, and the spaces 120 aligned with the flange segments 112, 114. Then, the floor member 106 is lowered until its top 112 sits down onto the tops of the bearing members 116. Then, the floor member 106 is moved lengthwise to place the flange segments 112 below the bearing members 116. The floor member 106 is then secured to a hydraulic cylinder which drives it lengthwise.

The drive mechanism for the floor shown by FIGS. 11-14 is not a part of this invention. It might be a mechanism of a type disclosed and described in the aforementioned U.S. Pat. No. 4,143,760. Or, a separate cylinder may be provided for each floor member 106. Valving may be provided for continuously advancing a group of three floor members, while retracting a fourth floor member at a faster rate of travel. A workable embodiment of this concept is disclosed by my aforementioned companion application Ser. No. 680,356 entitled "Reciprocating Floor Conveyor System".

Referring to FIG. 14, a space 122 is defined by and between each adjacent floor member sidewall 108, 110. This space 122 is narrower than the width of a floor member 106, but it is substantially large. It is large enough that the garbage load 96 can fall down into the spaces 122. In this embodiment, the sidewalls 108, 110 are relatively deep. The outer surfaces of the sidewalls 108, 110 contact the garbage within the spaces 122.

Then, in response to movement of a pair of floor members 106, the garbage in the space 122 between such floor members 106 is moved along together with the garbage on top of the floor members 106. This is because the outer surfaces 108, 110 of the floor members 106 provide sufficient friction to grab ahold of and move the garbage material 96.

Garbage material 96 is generally of such a composition that each part of it interlocks with an adjacent part. Thus, the moving garbage 96 on top of the floor members 106 will want to move with it the garbage that is within the spaces 122. The surface area provided by the outer surfaces of sidewalls 108, 110 enhances the force on the garbage intending to move it, or hold it, depending on what the floor members 106 are doing.

After use, a hose can be used for washing out whatever garbage remains in the channel regions between the floor members 106. In actual practice, it was found that the garbage in the spaces 122 is moved along quite positively and very little remains in the spaces.

Preferably, the tube members 102 are relatively strong lengths of steel tubing. They are welded directly to steel plate material 98 which is secured to the concrete base 100. The channel members 106 are steel members. These materials, and the materials used for the bearings 116 are all capable of carrying large weights. The spaces 122 between the floor members 106 are narrower than the tires of the garbage trucks. Thus, the garbage trucks can be driven out onto the floor. In some embodiments, it is highly desirable to make a quite large floor and either back or drive the garbage truck out onto the floor before dumping the garbage on it.

The embodiments which have been described above are represented for illustration and not limitation. I am only to be limited to the wording in the claims which follow, interpreted in accordance with the rules of claim interpretation, including the doctrine of equivalents.

What is claimed is:

1. A reciprocating floor conveyor, comprising:
   a plurality of laterally spaced apart support beams, each having opposite side walls and a top, and said top including a pair of oppositely extending flanges, each flange projecting laterally outwardly beyond the side wall on a side of the support beam;
   slide bearing means on said support beams, said slide bearing means including, on each side of each support beam, a top part situated above the support beam, a lower flange part located below the flange on its side of the support beam, and a web interconnecting the top part and lower flange part;
   a separate floor member associated with each said support beam, each floor member comprising a top, a pair of side walls depending from opposite side edges of the top, and flange means projecting inwardly from the side walls, towards the side walls of the support beams,
   wherein on each side of each support beam the top of the floor member rests on the top part of the bearing, the web of the bearing is inwardly contiguous to the side wall of the floor member, and the flange means on the floor member is located below the lower flange part of the bearing;
   fixed bottom wall means located between the support beams; and
   an open space defined by and between the adjacent side walls of each adjoining pair of floor members.

2. A reciprocating floor conveyor according to claim 1, wherein said fixed bottom wall means comprises a bottom member located between each adjacent pair of support beams, and said bottom member is integral with the adjacent side walls of the two support beams between which it is situated.

3. A reciprocating floor conveyor according to claim 2, wherein the support beams and the bottom members between the support beams are formed by interlocking extruded shapes.

4. A reciprocating floor conveyor according to claim 3, wherein each said extruder shape comprises a bottom member, a first side wall of a first support beam connected to one side of the bottom member, a second side wall of a second support beam, connected to the opposite side of the bottom member, at least a portion of the top of the first support beam connected to the first side wall, and at least a portion of the top of the second support beam connected to the second side wall.

5. A reciprocating floor conveyor according to claim 4, wherein each shape comprises a portion only of the top of the first support beam, formed integrally with the first side wall of the first support beam, including the flange portion of the top on such side of the support beam, and a portion only of the top of the second support beam, formed integrally with the second side wall of the second support beam, and including the top flange on such side of the second support beam.

6. A reciprocating floor conveyor according to claim 5, wherein the top portion of the first support beam includes one component of an interlock connection, and the top portion of the second support beam includes one component of an interlock connection.

7. A reciprocating floor conveyor according to claim 6, wherein the interlock connection component on the top part of the first support beam is connectable to an interlock connection component of a type on the top portion of the second support beam.

8. A reciprocating floor conveyor according to claim 1, wherein the inwardly projecting flange means on the floor members are flange segments spaced apart along the length of the floor member, and separated by open spaces between the flange segments, and wherein the outwardly projecting flanges on the top of each support beam are flange segments spaced apart along the length of the support beam, and separated by open spaces down through which the flange segments on the floor members may fit, so that the floor member can be installed by aligning its flange segments with the between flange spaces of the support beams, and wherein the floor members have operational positions in which their inwardly projecting flange segments are positioned below the outwardly projecting flange segments of the support beams.

9. A reciprocating floor conveyor according to claim 1, wherein each support beam top flange includes a downwardly projecting lock lip and the lower flange part of each slide bearing means comprises an upwardly projecting lock lip, positioned such that when the slide bearing means is on the support beam the slide bearing means upwardly projecting lock lip is located inwardly of a support beam top flange lock lip.

10. A reciprocating floor conveyor according to claim 9, wherein the top part, the web, the lower flange part and the upwardly directed lock lip portions of the slide bearing means together define an inner space, and wherein the top flange of the support beam is configured to snugly fit within this inner space.

11. A reciprocating floor conveyor according to claim 9, wherein said slide bearing means comprise separate members on opposite sides of the support beam, each said member having a top part, a web, a lower flange part and a lock lip.

12. A reciprocating floor conveyor according to claim 11, wherein said slide bearing means comprises a series of pairs of said bearing members spaced longitudinally along the support beam.

13. A reciprocating floor conveyor according to claim 1, wherein said slide bearing means comprise separate members on opposite sides of the support beam, each said member having a top part, a web, a lower flange part and a lock lip.

14. A reciprocating floor conveyor according to claim 13, wherein said slide bearing means comprises a series of pairs of said bearing members spaced longitudinally along the support beam.

15. A reciprocating floor conveyor according to claim 1, wherein said fixed bottom means comprises a bottom member located between each adjacent pair of support beams, wherein the support beams and the bottom members between the support beams are formed by interlocking extruded shapes, and wherein each shape includes at least one complete support beam between two complete bottom wall members and a portion of a support beam on each of its sides, each said support beam portion including a connector component by which it may be connected to a support beam portion of an adjacent shape.

16. A reciprocating floor conveyor according to claim 15, wherein the extruded shape comprises two complete support beams and three complete bottom members.

17. A reciprocating floor conveyor according to claim 1, wherein the fixed bottom wall means comprises a bottom member located between each adjacent pair of support beams, wherein the support beams and the bottom members between the support beams are formed by interlocking extruded shapes, and each said shape includes a first support beam half on one of its sides, including a first component of an interlock connection, and a second support beam half on its opposite side, including a complementary interlock component, so that the interlock component on one side of a shape can be interfitted with the interlock component on an opposite side of an adjacent shape, to connect the two shapes together and to complete a support beam at the connection.

18. A reciprocating floor conveyor according to claim 17, wherein one interlock component comprises a channel and the other interlock component comprises a lip sized to fit within said channel.

19. A reciprocating floor conveyor according to claim 17, wherein each said shape comprises a support beam half on each of its sides and a bottom member extending between and interconnecting said support beam halves.

20. A reciprocating floor conveyor according to claim 17, wherein each said shape comprises at least one complete support beam flanked by two channels, each of which is formed by a side of the support beam, a bottom member and an adjoining support beam side.

21. A reciprocating floor conveyor according to claim 1, wherein said fixed bottom wall means comprises a floor constructed from metal plate material on a base, and wherein the support beams comprise lengths of metal shapes which are spaced apart and fixed in position on the metal plate material and which extend upwardly from the metal plate material.

22. A reciprocating floor conveyor according to claim 21, wherein the support beams are lengths of rectangular metal tubing welded to the plate material.

23. A reciprocating floor conveyor according to claim 21, wherein the oppositely extending flanges on the support beams are formed from metal members welded to the tops of the shapes.

24. A reciprocating floor conveyor according to claim 23, wherein the inwardly projecting flange means on the floor members are flange segments spaced apart along the length of the floor member, and separated by open spaces between the flange segments and wherein the outwardly projecting flanges of the top of each support beam are flange segments spaced apart along the length of the support beam, and separated by open spaces down through which the flange segments on the floor members may fit, so that the floor member can be installed by aligning its flange segments with the between flange spaces of the support beams, and wherein the floor members have operational positions in which their inwardly projecting flange segments are positioned below the outwardly projecting flange segments of the support beams.

25. A reciprocating floor conveyor according to claim 1, wherein the floor members are downwardly opening metal channel members, and wherein the flange means on said floor members are formed by metal members connected to inside lower portions of the side walls of the channel members.

26. A reciprocating floor conveyor according to claim 21, wherein said base is a slab of concrete.

27. A reciprocating floor conveyor according to claim 1, wherein the support beams and the bottom wall means located between the support beams are secured to a heat insulated base, so that refrigerated air can be directed into spaces between the support beams and the heat insulated base will minimize a downward loss of refrigeration energy.

28. A reciprocating floor conveyor according to claim 1, wherein the support beams and the bottom wall means located between the support beams are secured to a heat insulated base, said floor members being supported with the side walls of adjacent floor members relatively close together, so that the conveyor can be used for conveying ice particles, the most of which are the size larger than the spaces between adjacent floor members, and wherein the side walls of adjacent support beams and the fixed bottom wall means located therebetween together define a collection channel for small ice particles and water.

29. A reciprocating floor conveyor according to claim 1, wherein adjacent floor members are positioned so that a space is defined between the adjacent side walls of said floor members which will receive material that is being conveyed by the conveyor, and wherein the said adjacent side walls of the floor members extend downwardly a substantial distance within said space and have outer side surfaces of substantial area, so that said side surfaces will contact material in the space and frictionally engage said material and move it together with the material on top of the adjacent floor members, when said floor members are being advanced together.

30. A reciprocating floor conveyor according to claim 29, wherein the bottom wall means is set onto a base which can carry the weight of a truck, and the floor members, the support beams and the slide bearing means can support the weight of a truck, and wherein the spaces that are defined by and between adjacent side walls of the floor members are narrower than the tires of the truck, so that the truck can be driven out onto the reciprocating floor conveyor.

31. A method of handling garbage at a transfer station, comprising:
providing a base structure leading to a discharge level;
positioning a container for receiving garbage with its top below the discharge level;
providing on said base structure a plurality of spaced apart parallel support beams, each having opposite side walls and a top, and flanges projecting laterally outwardly in opposite directions from the top;
providing slide bearing means on said support beams of a type including a top part situated above the support beam, a lower flange part located below the flange on its side of the support beam, and a web interconnecting the top part and the lower flange part;
providing a floor member on each support beam of a type comprising a top wall which rests on the top of the bearing, a pair of side walls which depend downwardly from the opposite side edges of the top of the floor member, and flange means which project inwardly from the side walls of the floor member, below the lower portions of the bearing means, towards the side walls of the support beams;
spacing the floor members apart a distance that will allow garbage placed on the floor members to fall between adjacent floor members;
dumping garbage onto the floor members; and
moving the floor members to advance the garbage to the container.

32. A method according to claim 31, comprising spacing the floor members apart a distance less than the width of the tires of a garbage truck,
using materials for the support beams, the floor members and the slide bearing means which can carry the weight of a garbage truck, and
driving the garbage truck out onto the floor members and then dumping garbage from the truck onto the floor members.

33. A method according to claim 31, comprising providing an upwardly sloping base structure with the discharge level at its upper end, and moving the floor members to advance the garbage up the base structure to the discharge level, and from the discharge level into the container.

34. A method of conveying particle ice, comprising:
providing an insulated base structure;
providing on said base structure a plurality of spaced apart, parallel support beams, each having opposite side walls and a top, and flanges projecting laterally outwardly in opposite directions from the top;
providing bottom members in the spaces between adjacent support beams, connected to the side walls of the support beams to define channels between the support beams;
providing slide bearing means on said support beams of a type including a top part situated above the support beam, a lower flange part located below the flange on its side of the support beam, and a web interconnecting the top part and the lower flange part;
providing a floor member on each support beam of a type comprising a top wall which rests on the top of the bearing, a pair of side walls which depend downwardly from the opposite side edges of the top floor member, and flange means which project inwardly from the side walls of the floor member, below the lower portions of the bearing means, towards the side walls of the support beams;
spacing the floor members apart a distance less than the size of most of the ice particles to be conveyed, so that such ice particles will not fall through the space between the floor members;
placing particle ice onto said floor members;
moving the floor members to advance the particle ice; and
using the channels to collect small ice particles and water from melted ice and carry it away from below the particle ice that is on the floor members.

35. A method of conveying a product that is in a refrigerated space, comprising:
providing an insulated base structure for said space;
providing on said base structure a plurality of spaced apart, parallel support beams, each having opposite side walls and a top, and flanges projecting laterally outwardly in opposite directions from the top;
providing slide bearing means on said support beams of a type including a top part situated above the support beam, a lower flange part located below the flange on each side of the support beam, and a web interconnecting the top part and the lower flange part;
providing a floor member on each support beam of a type comprising a top wall which rests on the top of the bearing, a pair of side walls which depend downwardly from the opposite side edges of the top of the floor member, and flange means which project inwardly from the side walls of the floor members, below the lower portions of the bearing means, towards the side walls of the support beams;
spacing the floor members laterally apart to provide a substantial space between adjacent floor members;
placing a load on the floor members;
moving the floor members to advance the load towards one end of the space; and
refrigerating the space, at least by circulating refigerated air through the spaces between adjacent floor members.

* * * * *